Figure 1:
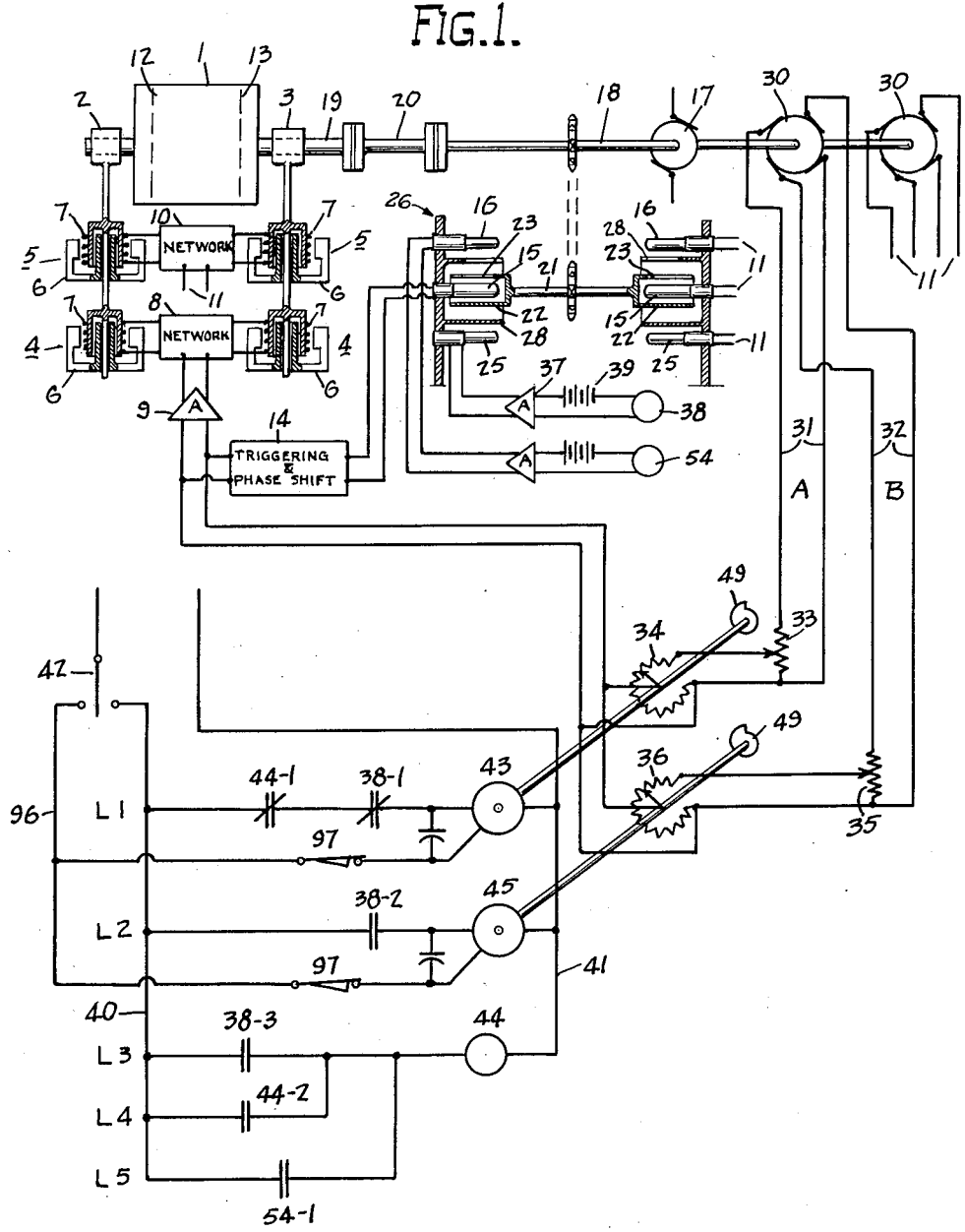

INVENTOR.
Robert J. Fibikar

May 8, 1962 R. J. FIBIKAR 3,033,041
APPARATUS FOR MEASURING COMPONENT CORRECTIONS FOR UNBALANCE
Filed Nov. 2, 1955 7 Sheets-Sheet 4

INVENTOR.
Robert J. Fibikar
BY *Andrus & Sceales*
ATTORNEYS.

May 8, 1962 R. J. FIBIKAR 3,033,041
APPARATUS FOR MEASURING COMPONENT CORRECTIONS FOR UNBALANCE
Filed Nov. 2, 1955 7 Sheets-Sheet 6

INVENTOR.
Robert J. Fibikar
BY
ATTORNEYS.

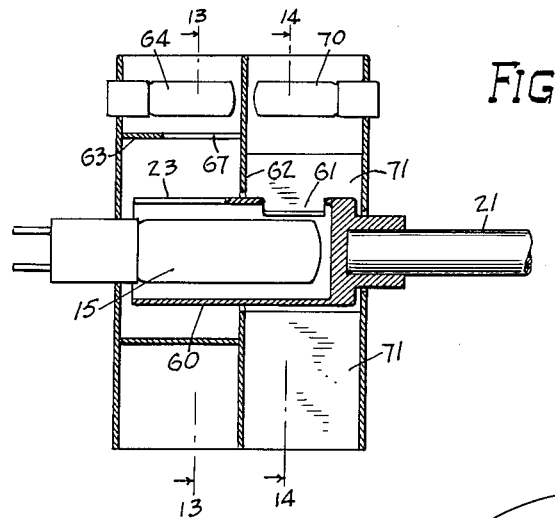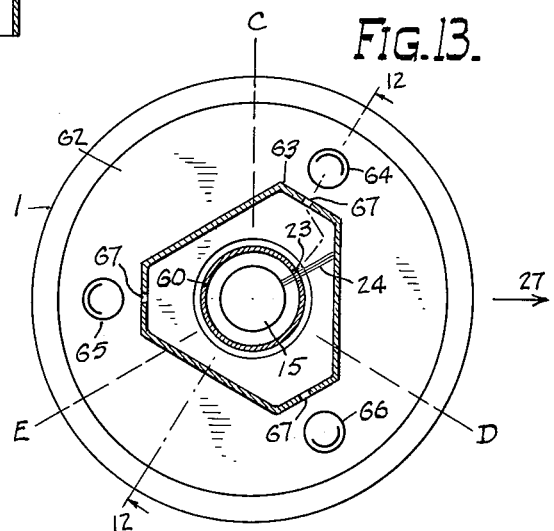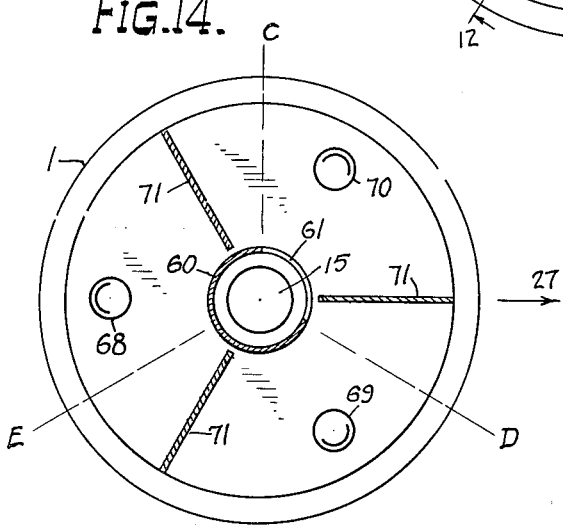

United States Patent Office 3,033,041
Patented May 8, 1962

3,033,041
APPARATUS FOR MEASURING COMPONENT CORRECTIONS FOR UNBALANCE
Robert J. Fibikar, Madison, Wis., assignor to Gisholt Machine Company, Madison, Wis., a corporation of Wisconsin
Filed Nov. 2, 1955, Ser. No. 544,483
4 Claims. (Cl. 73—466)

This invention relates to apparatus for measuring component corrections for unbalance in a rotary workpiece, as where at least two separate corrections for unbalance are required at known points in the workpiece variously offset from the determined point of correction needed for the workpiece.

Many articles such as crankshafts, bladed fans and the like cannot be corrected for unbalance at every point in the full 360° of circumference, but must be corrected at points where either material is available for removing without damage thereto or where weight may be added without interfering with the use of the article. In such instances, it is desired to select two points of correction on opposite sides of the determined desired point of correction and the components of which will have a combined correction effect equivalent to the desired correction.

Heretofore, in order to make component corrections it has been necessary to manually read correction component measurements and to set the correction equipment from such readings, as for instance described in Patent Nos. 2,235,393 and 2,315,578 granted to J. G. Baker. Where two plane correction was employed the readings and corrections were made separately for each plane.

The present invention provides automatic means for determining the component amounts of correction to be applied at two known available points of correction. The determinations may be obtained simultaneously and made transferable directly to control correction apparatus as in the case of fully automatic balancing machines.

Where the workpieces are of a character having identified available points of correction, such as a crankshaft, it is possible to always construct them with a heavy side somewhere between the points, as when correction is made by removal of material therefrom, or with a light side somewhere between the points, as when correction is made by adding material thereto. In such case the unbalance to be corrected will always be between the angle locations for available correction and the component determination can be made for each successive workpiece without any preliminary testing.

Where the workpieces are more symmetrical and have three or more similar points available for correction, as a fan with three or more blades, the present invention provides automatic means for determining which two adjacent blades or members are nearest and on opposite sides of the angular location for the needed correction, before the component correction is measured for each.

The invention utilizes the principles of angle determination of unbalance set forth in the application, Serial No. 468,397, filed November 12, 1954, by Werner I. Senger, now Patent No. 2,944,424 and assigned to a common assignee herewith. In said application a stroboscopic light beam is made to register with a light pickup means such as a photo-cell to determine the angle location of maximum vibration amplitude from the unbalance, and the workpiece is thereafter indexed to the same point of registry to locate the angle of unbalance therein.

According to the present invention in its principal embodiment, the stroboscope pulse is first altered in phase to make the registry with the photo-cell correspond to one of the available angles of correction in the workpiece, and is then measured as by weighing to zero to obtain the component amount of correction needed at that angle. The phase shift referred to is measured by a similar weighing action which simultaneously determines the amount of correction at the other selected angle. The two measuring operations can be carried on either simultaneously or in succession.

Where a symmetrical workpiece such as a fan having three or more blades is to be balanced, the invention utilizes initially the same number of photo-cells as there are blades, the photo-cells being spaced circumferentially corresponding to the blades, and by determining between which two of the photo-cells the maximum unbalance occurs it is possible to select the two blades in which the correction will be made. Thereafter, the component correction can be measured for these two blades.

The invention is applicable to either static or dynamic balancing and to either one or two plane balance correction. The workpiece may be mounted seismically as in normal balancing machines employing means to measure unbalanced vibrations in a horizontal plane, or the workpiece may be mounted as in critical speed balancing machines employing phase shift means. Plane separation and the amount of unbalance in each plane may be obtained and determined by employing a pivotal cradle, nodal bar, electrical phase shift, electrical network or electrical computing means. The components of correction for two points for each plane can all be obtained simultaneously.

The invention is illustrated somewhat schematically in the accompanying drawings in the best mode presently contemplated of carrying out the invention as applied to a machine that employs electro-magnetic vibration pickup means to measure the amount of unbalance and simultaneously therewith trigger a stroboscopic light source in synchronism with a given point in the vibratory cycle of the workpiece.

Figure 2:
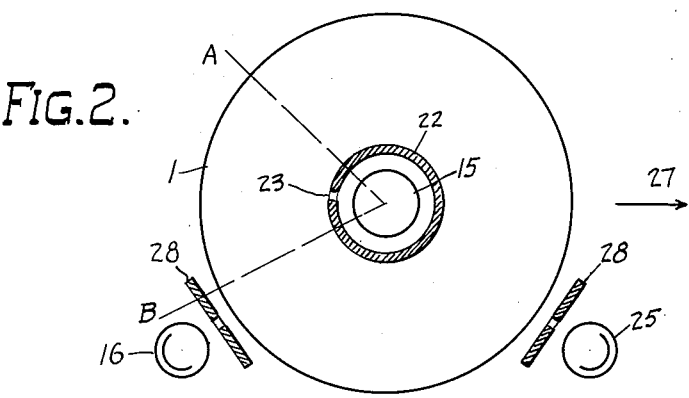
Figure 3:
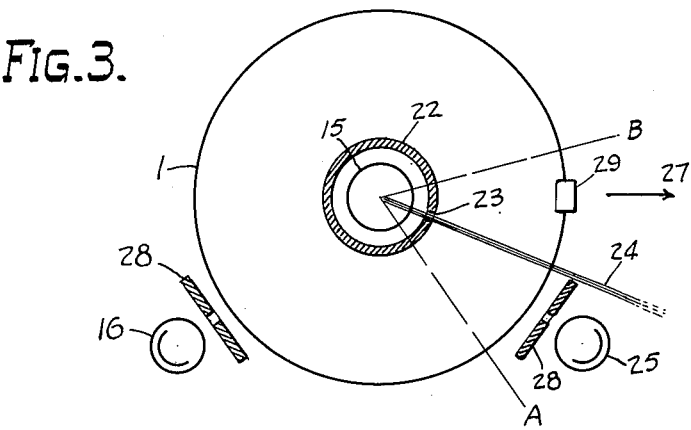
Figure 4:
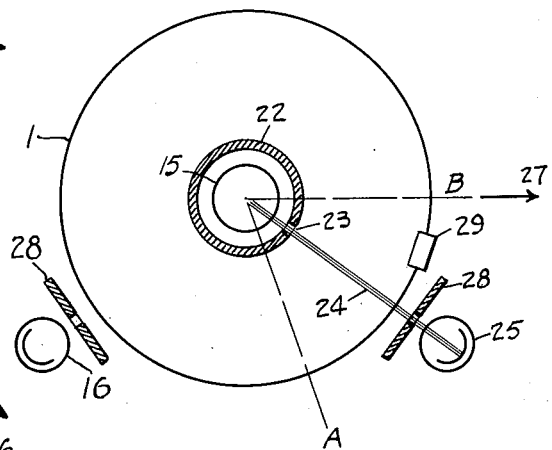
Figure 5:
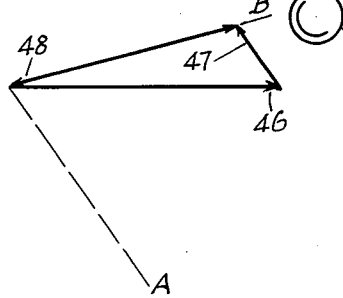
Figure 6:
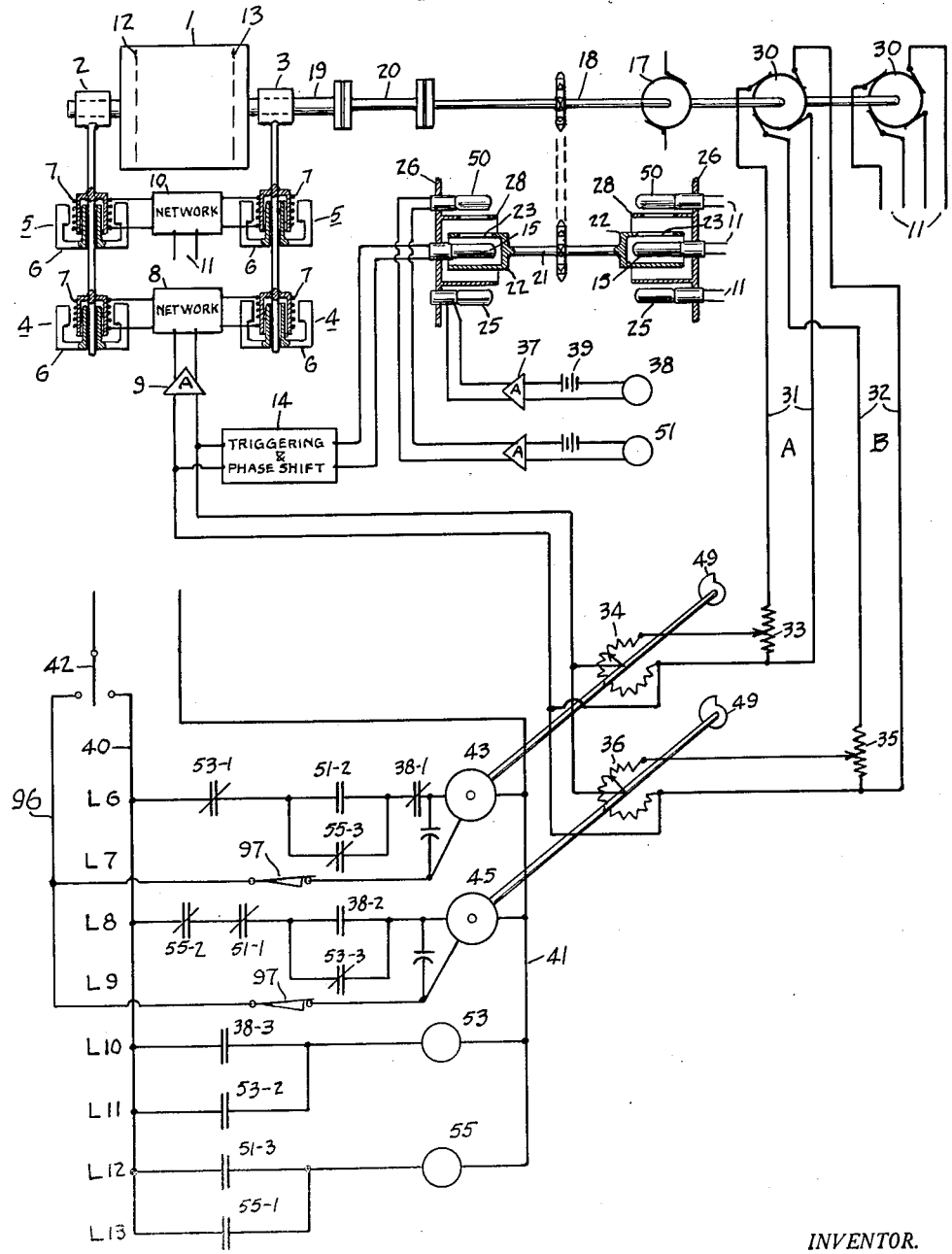
Figure 7:
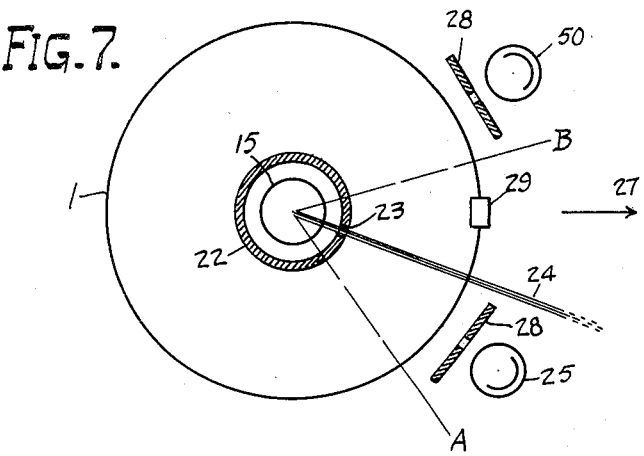
Figure 8:
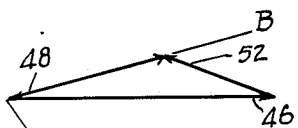
Figure 9:
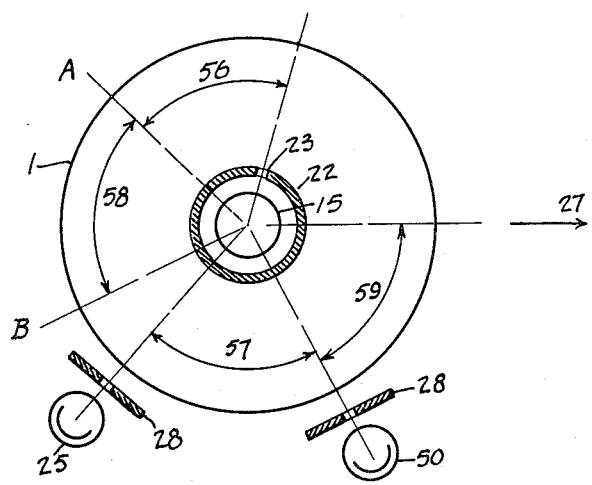
Figure 10:
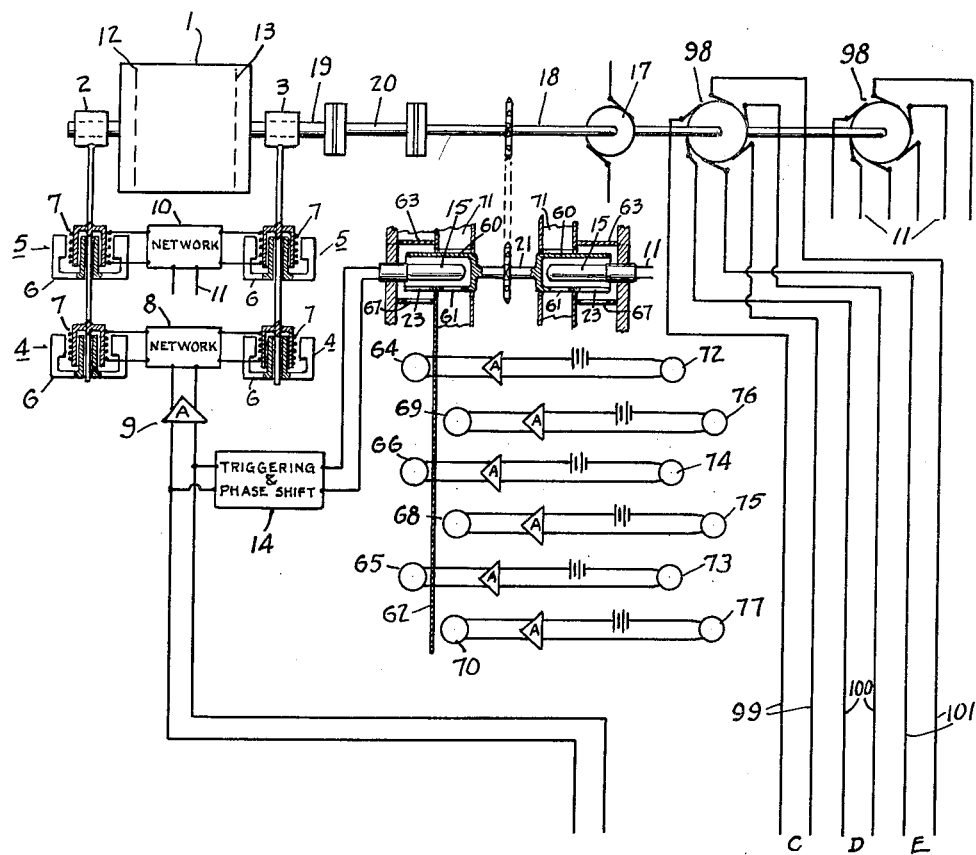
Figure 11:
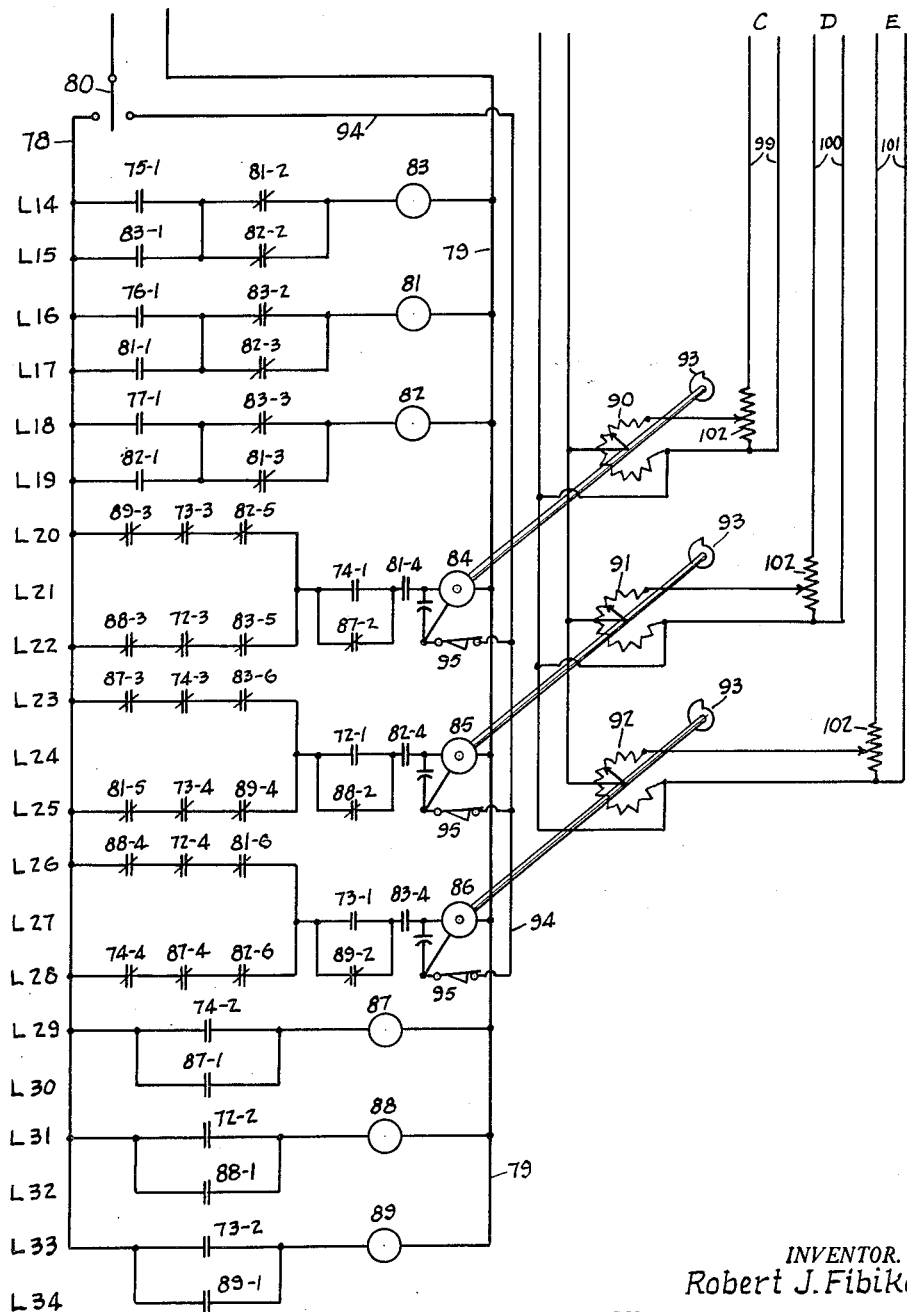

In the drawings:
FIGURE 1 is a schematic plan view showing an unbalance determining apparatus embodying the invention with a wiring diagram shown in detail for one plane;
FIG. 2 is a diagrammatic showing of the angular relationships between the stroboscopic apparatus and the workpiece;
FIG. 3 is a similar diagrammatic view shown with the point or angle of maximum unbalance indicated;
FIG. 4 is a similar view shown after the first measuring or weighing step of the present invention;
FIG. 5 is a vector diagram of the voltages involved in measuring as illustrated in FIGS. 1–4;
FIG. 6 is a view similar to FIG. 1, showing the use of two photo-cell light pickups for simultaneous measuring of the two components;
FIG. 7 is a view similar to FIG. 3, showing the use of two photo-cells so that measuring can be more rapid;
FIG. 8 is a vector diagram of the voltages involved in measuring as illustrated in FIGS. 6 and 7;
FIG. 9 is a diagrammatic showing of angle selection requirements;
FIG. 10 is a schematic view similar to FIG. 6 showing an apparatus for determining components for three bladed fans and the like and wherein the photo-cell pickups for one plane are shown in projected elevation, and with the control circuit removed;
FIG. 11 is a wiring diagram of a control circuit for FIG. 10;
FIG. 12 is an enlarged axial detail section of one stroboscopic apparatus of FIG. 10, taken on line 12—12 of FIG. 13;
FIG. 13 is a section taken on line 13—13 of FIG. 12, with the workpiece transposed to the same axis to show the correlative components and angle locations; and
FIG. 14 is a section taken on line 14—14 of FIG. 12, with the workpiece transported to the same axis to show the correlative components and angle locations.

The apparatus illustrated in FIG. 1 employs two plane separation and comprises, in general, the usual workpiece 1 mounted on bearings 2 and 3 which are supported flexibly to provide for free lateral movement of the workpiece generally in a horizontal plane in response to unbalance vibrations during rotation of the workpiece.

Two vibration pickup devices 4 and 5 are associated with each bearing 2 and 3, and for illustrative purposes each pickup device comprises a permanent magnet 6 with suitable air gaps in its magnetic flux circuit in which a coil 7 is located.

Each coil 7 is either supported by or connected to the corresponding bearing 2 or 3 to vibrate therewith and thereby cut magnetic lines of force passing across the gap in the corresponding magnet 6, to generate electrical potential impulses in the coil proportional to and having a fixed phase relation to the vibration resulting from the unbalance in the rotating workpiece. The output signal established by the pickups 4 and 5 is an alternating current sine wave of a frequency corresponding to the rotational speed of the motor 17 and the attached workpiece 1. The triggering and phase shift device 14 establishes a series of sharp triggering pulses. Each triggering pulse is in phase with the zero crossover point in the sine wave of the output signal and there is one pulse for each revolution of the workpiece 1, as more fully described in the previously referred to Baker Patent 2,165,024.

The coils 7 of pickups 4 are shown as connected through a suitable electrical network 8 to an amplifier 9 which electronically amplifies the voltage pulses received from the coils for a plane. Similarly coils 7 of pickups 5 are shown as connected through a suitable electrical network 10 to broken leads 11 going to a corresponding amplifier and circuit for the other plane in the event two plane correction is employed.

The networks illustrated in the Baker et al. Patent No. 2,165,024, granted July 4, 1939, are suitable for plane separation and in the present instance the wiring diagram illustrated in detail is for one correction plane 12, it being assumed that leads 11 go to a duplicate wiring diagram for the other correction plane 13. The illustrated diagram may also be employed for static balancing if desired.

Since the circuits for determining the components of correction for plane 12 are identical to the circuits for plane 13, only the circuits for one plane need be described.

The voltage pulses from amplifier 9 pass to a triggering and phase shift device 14 for energizing the corresponding stroboscope lamp 15 intermittently in synchronism with the vibration of the workpiece 1 effected by its unbalance during rotation. A suitable triggering and phase shift device and stroboscope circuit is set forth for instance in the Baker et al. Patent No. 2,165,024, granted July 4, 1939.

The workpiece 1 is driven by any suitable means such as the electric motor 17 having its shaft 18 detachably coupled to the shaft 19 of the workpiece by a flexible drive 20 that permits freedom of unbalance vibrations in the workpiece during rotation.

The stroboscope lamps 15 are disposed axially at opposite ends of a shaft 21 driven from the motor shaft 18 with a 1 to 1 ratio to rotate in synchronism with the workpiece. A cup-like shield 22 is attached to each corresponding end of the shaft 21 to surround the corresponding lamp 15. Shield 22 has an opening or narrow slot 23 at one side to emit a radial light beam 24 when lamp 15 is energized.

In carrying out the invention a light pickup such as a photo-cell 25 is mounted on a fixed support 26 at a predetermined acute angular position relative to the direction of vibration pickup which is represented in FIGS. 2 to 4 as arrow 27. A slotted shield 28 in front of photo-cell 25 controls and limits the beam 24 entering the photo-cell.

When the unbalance in the workpiece 1, shown as the unbalance mass 29 in FIGS. 3 and 4, is in the direction of arrow 27 as shown in FIG. 3, the stroboscope lamp 15 is energized to flash momentarily thereby emitting a radial light beam 24 through slot 23.

The system of FIGS. 1 to 5, inclusive, may be employed where the angle of unbalance in the workpieces can be initially controlled in fabrication to lie between radial lines A and B representing the points of available correction, as shown in FIG. 2. In such a case where only correction for static unbalance is needed, only one set of pickups either 4 or 5, need be used and planes 12 and 13 may be disregarded. Where plane separation is needed both sets of pickups 4 and 5 will be used and two components of correction will be determined for each plane 12 and 13.

The stroboscope lamp 15 and light pickup 25 for the circuit of pickups 4 are shown at one end of shaft 21 and connected into the circuit. The lamp 15 and pickup 25 for the circuit of pickups 5 are shown at the other end of shaft 21 and with broken connecting leads 11 going to the circuit for plane 13.

For this purpose the circuit for each plane 12 and 13 has a generator 30 driven in synchronism with the workpiece as by coupling motor shaft 18 directly to the shaft of the generator as shown in FIG. 1.

A different phase of alternating potential is produced by each generator 30 for each correction component needed in the corresponding plane. The two phases for the corresponding two components of correction for static unbalance or for each plane, as the case may be, are adjustable to be separated in degrees approximately corresponding to the smallest angle between the available correction points A and B. This phase relationship for the output of generator 30 for plane 12 may be expressed by labeling one pair of output leads 31 thereof as the A phase and the other pair of output leads 32 thereof as the B phase, in FIG. 1. The broken leads 11 from the generator 30 for plane 13 go into the circuit for that plane similar to the description for leads 31 and 32 for plane 12.

Referring to the circuit for plane 12, as shown, the A phase from generator 30 is directly opposite to the phase of the unbalance pulse energizing stroboscope lamp 15 when the unbalance is located at angle A.

The B phase from generator 30 is directly opposite to the phase of the unbalance pulse energizing stroboscope lamp 15 when the unbalance is located at angle B.

Phase A from generator 30 is calibrated by the adjustable potentiometer 33 and then passed through the measuring potentiometer 34 to the leads from amplifier 9 to the trigger and phase shift device 14.

Likewise, phase B from generator 30 is calibrated by the adjustable potentiometer 35 and then passed through the measuring potentiometer 36 to the same leads from amplifier 9 to the corresponding trigger and phase shift device 14.

By reason of the arrangement just described the phases A and B from generator 30 can be made to buck and thereby measure or weigh the component phases of the pulse which energizes the stroboscope lamp 15.

For this purpose the potential passed by photo-cell 25 upon receiving light beam 24 is amplified as at 37 to control the energization of a relay 38 by battery 39.

As shown in FIG. 1, a control circuit has input leads 40 and 41 connected through contactor 42 to a suitable source of current, not shown, a plurality of cross leads between leads 40 and 41 are numbered from L1 through L5. The contactor 42 may be closed either manually or by an automatic relay when it is desired to determine the component corrections.

Upon closing of contactor 42, and assuming that the motor 17 is running and the mass 29 on workpiece 1 is effecting flashing of stroboscope lamp 15 each revolution as indicated in FIG. 3, photo-cell 25 being dark and relay 38 being de-energized, current will be supplied to motor 43 in line L1 for driving potentiometer 34 through the normally closed relay contacts 38—1 and 44—1.

Motor 43 drives potentiometer 34 to increase the voltage pulses of the A phase until they buck out the A component of the pulses feeding the stroboscope lamp 15 and the latter flashes at the instant when slot 23 directs a light beam 24 toward photo-cell 25, whereupon relay 38 becomes energized and opens its contacts 38—1 in line L1 to stop motor 43.

Relay 38 closes the normally open contacts 38—2 in line L2 to energize motor 45 which drives the weighing potentiometer 36 for phase B.

Motor 45 drives potentiometer 36 until the phase B bucks the pulses energizing lamp 15 to zero whereupon relay 38 becomes de-energized and contacts 38—2 open to stop motor 45.

While relay 38 was energized it also closed contacts 38—3 in line L3 which energized an interlock relay 44 that opened contacts 44—1 and locked motor 43 from becoming energized for the remainder of the cycle after de-energization of relay 38 as above described.

Relay 44 also closes a holding circuit therefor through contacts 44—2 in line L4 which by-pass contacts 38—3 and maintain relay 44 energized until contacts 42 are opened to make the circuit ready for the next cycle.

The bucking voltages involved in the construction of FIGS. 1–4 are shown in the vector diagram of FIG. 5 wherein the vibration pickup voltage produced by unbalance mass 29 that triggers the stroboscope lamp 15 is represented by vector 46 which is proportional in length to the magnitude of the unbalance and is in phase with the unbalance.

As motor 43 actuates potentiometer 34 the latter transmits a bucking voltage represented by vector 47 from generator 30 to the unbalance pickup circuit that bucks out the component of the pulses being fed to lamp 15 represented by component A. The length of vector 47 is determined when light beam 24 strikes photo-cell 25, at which time component B will be in the position of arrow 27.

Thereafter motor 45 actuates potentiometer 36 to apply a bucking voltage in opposite phase to that of the resultant pulses energizing lamp 15 until the latter are fully bucked out, as represented by vector 48.

The voltages represented by vectors 47 and 48 are directly proportional to the unbalance correction required at the component correction lines A and B, respectively.

In the event that the unbalance mass 29 falls on component correction line A and the B component is zero, relay 38 is not energized and there is no means of stopping motor 43 upon bucking of vector 46 to zero. In order to avoid this a second photo-cell 16 is disposed at an angle to the location of photo-cell 25 that is supplementary to the angle between correction lines A and B and in a clock-wise direction from photo-cell 25 as shown in FIG. 3.

Photo-cell 16 will receive light when vector 48 of vector 46 passes zero and re-energizes stroboscope lamp 15. Upon energization of photo-cell 16 its relay 54 closes contacts 54—1 in line L5 to energize relay 44 in line L3 and thereby stop motor 43.

Where photo-cell 25 is located above arrow 27 instead of below it as shown, component B will be measured first followed by a measuring of component A. In that case, if mass 29 falls on correction line B and component A is zero, the photo-cell 16 should be located counterclockwise from photo-cell 25 an angular amount supplemental to the angle between correction lines A and B.

In an automatic balancing machine each of the shafts of the potentiometers 34 and 36 will carry a recording or registering means such as cam 49 which will control the amount of correction for its respective component of the unbalance to be corrected.

More rapid determination of the components may be obtained by employing an additional photo-cell 50, as illustrated in FIGS. 6 to 8, inclusive. In this construction the photo-cell 50 is carried by support 26 at an angle from photo-cell 25 corresponding to the angle between available correction lines A and B.

In this construction either photo-cell 25 or photo-cell 50 is employed, depending upon which correction component is the larger.

The circuit for this construction varies from that in FIG. 1 by the addition of the necessary relays and contacts. As shown in FIGS. 6–8 the same numbers are applied to the specific parts as in FIGS. 1–5.

Photo-cell 50 when receiving light passes a potential that is amplified and then energizes relay 51 to effect the desired control.

When the contacts 42 are closed it is expected that neither photo-cell 25 nor 50 receives light from lamp 15. As a consequence both motors 43 and 45 are energized to actuate the corresponding potentiometers 34 and 36, respectively, and simultaneously start bucking the pulses energizing lamp 15.

If the component for correction line B is larger than that for correction line A, the common bucking action represented in FIG. 8 by the added vector 52 will continue until photo-cell 25 receives light. Thereupon the relay 38 is energized to open contacts 38—1 in line L6 of FIG. 6 and stop motor 43. At the same time it closes contacts 38—2 in line L8 to retain motor 45 in drive. Contacts 38—3 in Line L10 close to energize relay 53 and thereby open contacts 53—1 in line L6 and close contacts 53—2 in line L11 and which by-pass contacts 38—3 and provide a holding circuit for relay 53.

Relay 53 in FIG. 6 opens an additional set of contacts 53—3 in line L9 which are by-passed by the closed contacts 38—2 referred to, so that motor 45 will stop when contacts 38—2 open later.

When the unbalance voltage pulses feeding light 15 are bucked to zero relay 38 will de-energize thereby closing its contacts 38—1 in line L6 and opening its contacts 38—2 in line L8 and 38—3 in line L10. However, contacts 53—1 and 53—3 will remain open, thereby assuring that both motors 43 and 45 will be stopped and remain stopped until contacts 42 are opened to reset the relays for the next cycle.

If the component for correction line A is larger than that for correction line B, with both motors 43 and 45 operating, the vector 52 will extend toward correction line A from vector 46. When it intersects line A it has completed the weighing or bucking of the component of correction line B and photo-cell 50 will receive light and energize its relay 51.

Energization of relay 51 opens its contacts 51—1 in line L8 to stop motor 45. Contacts 51—2 in line L6 close to keep motor 43 operating regardless of opening of contacts 55—3 in line L7 as hereinafter described. Contacts 51—3 in line L12 close to energize relay 55.

Contacts 55—1 in line L13 close a holding circuit for relay 55 by-passing contacts 51—3. Contacts 55—2 in line L8 open to prevent re-energization of motor 45 when relay 51 is later de-energized. Contacts 55—3 in line L7 open to cause motor 43 to stop when contacts 51—2 in line L6 open as the unbalance voltage pulses feeding light 15 are bucked to zero along the angle A component line.

In either event, whether the final weighing or measuring is done by bucking the angle A component to zero or the angle B component to zero, the motors 43 and 45 remain de-energized for the balance of the work cycle and will not start again until after an opening and closing of the weighing contacts 42. Opening of the contacts 42 in FIG. 6 serves to de-energize either relay 53 or 55, as the case may be, and thereby cocks the circuit for the next weighing or measuring operation or cycle.

In FIG. 9 the rules for selection of angle locations are shown. As shown, the slot 23 may be at any angle 56 with respect to the available component correction line A for the particular workpiece. Angle 56 should be fixed and kept identical for all subsequent like workpieces.

The angle 57 between the photo-cells 25 and 50 constitute a photo-cell sector and should be identical to the angle 58, the component sector between correction lines A and B of the workpiece. The angle 59 between the photo-cell 50 and the radial line of arrow 27, the location of unbalance at the instant the stroboglow flashes, must be identical to the slot reference angle 56.

This means that for a given angle 56 between slot 23 and correction line A, the angle 59 will locate photo-cell 50 at a position where it will receive light from stroboscope lamp 15 when the unbalance mass 29 is on correction line A. Likewise photo-cell 25 will then be positioned so that it will receive light from lamp 15 when the unbalance mass 29 is on correction line B.

The above rules with respect to angle locations are essential to insure that the light beam 24 will be within the sector of the radial lines for photo-cells 25 and 50 when the unbalance mass is between correction lines A and B.

The invention also provides means for determining the component corrections for an unbalance occurring at any angular location provided that more than two correction lines are available and are equally spaced circumferentially of the workpiece. FIGS. 10 to 13, inclusive, illustrate this feature of the invention as applied to three equally spaced possible correction lines C, D and E.

For this purpose, as shown in FIG. 10, each cup or shield 60 attached to the end of the shaft 21 has two separate slots 23 and 61 therein in different longitudinal regions of the cup. Slot 23 is comparable to the slot 23 previously described and functions similarly. Slot 61 is equal in width to the sector represented by the angle between any two adjacent correction lines C, D and E.

A baffle 62 extends as a wall normal to the axis of shield 60 and has an opening therein for receiving the shield. The baffle 62 separates the light passing through slot 23 from the light passing through slot 61 when light 15 within cup 60 is energized.

As shown in FIGS. 12 and 13 a second baffle 63 extends circumferentially of the cup 60 on the outer side of baffle 62 to confine the light beam 24 passing through slot 23.

Three photo-cells 64, 65 and 66 are equally spaced circumferentially about the baffle 63 and the latter has a fixed slot 67 therein for each photo-cell to transmit beam 24 to the photo-cell should slot 23 and slot 67 register radially at the instant light 15 flashes.

Each photo-cell 64, 65 and 66 will read for one of the three correction lines C, D and E as photo-cell 25 did for correction line B and photo-cell 50 did for correction line A.

For this purpose it is first necessary to determine between which two component lines the unbalance falls. To do this the construction on the inner side of baffle 62 as shown in FIGS. 12 and 14, is employed.

This construction comprises three scanner photo-cells 68, 69 and 70 spaced apart equally circumferentially about the cup 60 and spaced radially therefrom as shown. A radially extending baffle plate or divider 71 is disposed midway between each of the adjacent photo-cells 68, 69 and 70 as shown in FIG. 14, the angle between them corresponding to the angle between the available correction lines C, D and E, respectively. The angle width of slot 61 is such that when the cup or shield 60 rotates, the slot will direct light to not more than two photo-cells at any one instant of strobo flash of lamp 15. There will always be one dark photo-cell.

The slots 23 and 61 in cup 60 need not be initially indexed relative to the correction lines C, D and E, the position being shown illustrative only.

Referring to FIG. 10, each of the photo-cells 64, 65, 66, 68, 69 and 70, when it receives light passes an amplified voltage from a corresponding battery to energize the corresponding relay 72, 73, 74, 75, 76 or 77, as the case may be.

The control circuit in FIG. 11 receives its control voltage from the input lines 78 and 79 through the normally open contacts 80 in line 78. The several control lines are numbered L14 to L34, respectively.

The closing of contacts 80 after the workpiece is rotating at the desired speed will effect a flashing of lamp 15 in cup or shield 60 at the instant the unbalance mass passes arrow 27, shown in FIGS. 13 and 14.

If the unbalance mass is located between correction lines C and D, and the cup 60 is positioned as shown relative to the correction lines, lamp 15 will flash and send light through the wide slot 61 to photo-cells 69 and 70 each time the unbalance mass passes the pickup station represented by arrow 27.

Momentary energization of photo-cell 69 actuates relay 76 which closes contacts 76—1 in line L16 to energize relay 81.

Momentary energization of photo-cell 70 actuates relay 77 which closes contacts 77—1 in line L18 to energize relay 82.

Relay 83 in line L14 remains de-energized since photo-cell 68 remains dark.

Energization of relay 81 closes the holding contacts 81—1 in line L17 which by-pass contacts 76—1 to hold the relay operative; opens contacts 81—2 in line L14; opens contacts 81—3 in line L19; closes contacts 81—4 in line L21 to start motor 84; opens contacts 81—5 in line L25; and opens contacts 81—6 in line L26.

Energization of relay 82 closes the holding contacts 82—1 in line L19; opens contacts 82—2 in line L15; opens contacts 82—3 in line L17; closes contacts 82—4 in line L24 to start motor 85; opens contacts 82—5 in line L20; and opens contacts 82—6 in line L28.

In the position of the several contacts of relays 81 and 82 just described, with the relays energized both contacts 81—2 and 82—2 are open and along with the normally open contacts 75—1 and 83—1 assure that relay 83 in line L14 is not energized; relay 81 is energized for the remainder of the cycle through its holding contacts 81—1 and the normally closed contacts 83—2 in line L16; relay 82 is energized for the remainder of the cycle through its holding contacts 82—1 and the normally closed contacts 83—3; motor 84 is energized through the normally closed contacts 88—3, 72—3, 83—5 and 87—2 in line L22, and the closed contacts 81—4 in line L21; motor 85 is energized through the normally closed contacts 87—3, 74—3 and 83—6 in line L23, contacts 88—2 in line L25 and closed contacts 82—4 in line L24; and motor 86 is prevented from operation by reason of normally open contacts 83—4 in line L27; and the open contacts 81—6 in line 26 and 82—6 in line L28.

Relays 87, 88 and 89 in lines L29, L31 and L33, respectively, remain de-energized.

Motors 84 and 85 actuate corresponding potentiometers 90 and 91 until the bucking potential applied through the potentiometers to the circuit of lamp 15, shift the phase of the latter relative to the location of the unbalance mass at the time of triggering to a position where either photocell 64 or 66 receives light. Potentiometer 92 remains unactuated by reason of de-energization of its motor 86.

If photo-cell 64 receives light first, indicating that the unbalance mass is nearest to correction line D, it energizes relay 72 which in turn closes contacts 72—1 in line L24; closes contacts 72—2 in line L31 to energize relay 88; opens contacts 72—3 in line L22; and opens contacts 72—4 in line L26.

Energization of relay 88 closes the holding contacts

88—1 therefor in line L32, by-passing contacts 72—2; opens contacts 88—2 in line L25 to give control of motor 85 to relay 72 through its contacts 72—1; opens contacts 88—3 in line L22; and opens contacts 88—4 in line L26.

In the position just outlined for the relays and contacts: motor 84 is stopped by reason of the fact that contacts 82—5 in line L20 and contacts 72—3 and 88—3 in line L22 are open; motor 85 continues to be energized through the normally closed contacts 87—3, 74—3 and 83—6 in line L23, and closed contacts 72—1 and 82—4 in line L24; and motor 86 remains de-energized by reason of normally open contacts 83—4 in line L27 and the open contacts 88—4, 72—4 and 81—6 in line L26, and open contacts 82—6 in line L28.

Motor 85 thereupon continues to buck out lamp 15 to zero, at which point photo-cell 64 receives no more light and relay 72 becomes de-energized and opens contacts 72—1 in line L24 stopping the motor, contacts 88—2 remaining open due to the holding of relay 88 energized by the interlock 88—1 after opening of contacts 72—2.

At this point in the cycle all motors 84, 85 and 86 are stopped and remain so until contacts 80 open and terminate the cycle, whereupon all relays become de-energized and all contacts return to normal position as shown.

If photo-cell 66 is the first to receive light, indicating that the unbalance mass is nearest to correction line C, it thereupon energizes relay 74 to close contacts 74—1 in line L21; close contacts 74—2 in line L29 to energize relay 87; open contacts 74—3 in line L23 and open contacts 74—4 in line L28.

Energization of relay 87 closes holding contacts 87—1 therefor in line L30, by-passing contacts 74—2; opens contacts 87—2 in line L22; opens contacts 87—3 in line L23; and opens contacts 87—4 in line L28.

In the position just outlined for the relays and contacts: motor 84 continues to be energized through the normally closed contacts 88—3, 72—3 and 83—5 in line L22, and closed contacts 74—1 and 81—4 in line L21; motor 85 is stopped by reason of the fact that contacts 87—3 and 74—3 in line L23 and 81—5 in line L25 are open; and motor 86 remains de-energized by reason of the normally open contacts 83—4 in line L27, open contacts 81—6 in line L26, and open contacts 87—4, 74—4 and 82—6 in line L28.

Motor 84 continues to buck out lamp 15 to zero, at which point photo-cell 66 ceases to receive light and relay 74 becomes de-energized and opens contacts 74—1 stopping the motor, contacts 87—2 remaining open due to the holding of relay 87 energized by the interlock 87—1 after opening of contacts 74—2.

All motors are stopped at this point and remain so until the end of the cycle at which contacts 80 open to return the circuit to start.

Each of the motors 84, 85 and 86 actuate a corresponding correction setting or recording means illustrated as a cam 93 secured to the motor shaft and which is used to measure and control the amount of correction for unbalance similar to cams 49 in FIGS. 1 and 6.

If the unbalance mass exists between correction lines D and E with the cup 60 positioned as illustrated, lamp 15 will flash and send light through the wide slot 61 to photo-cells 70 and 68 each time the unbalance mass passes the pickup arrow 27.

Energization of photo-cells 70 and 68 will actuate the corresponding relays 77 and 75 which in turn close the corresponding contacts 77—1 in line L18 and 75—1 in line L14 to energize the corresponding relays 82 and 83.

Energization of relay 82 in line L18, as previously described, closes the holding contacts 82—1 in line L19; opens contacts 82—2 in line L15; opens contacts 82—3 in line L17; closes contacts 82—4 in line L24 to start motor 85; opens contacts 82—5 in line L20, and opens contacts 82—6 in line L28.

Energization of relay 83 in line L14 closes the holding contacts 83—1 in line L15 which by-pass contacts 75—1 to hold the relay operative; opens contacts 83—2 in line L16; opens contacts 83—3 in line L18; closes contacts 83—4 in line L27 to start motor 86; opens contacts 83—5 in line L22; and opens contacts 83—6 in line L23.

In the position for the several contacts and relays 82 and 83 just described, with the relays energized: both contacts 82—3 and 83—2 are open assuring that relay 81 is not energized; relay 82 is energized for the remainder of the cycle through its holding contacts 82—1 and the normally closed contacts 81—3; relay 83 is energized for the remainder of the cycle through its holding contacts 83—1 and the normally closed contacts 81—2; motor 86 is energized through the normally closed contacts 88—4, 72—4 and 81—6 in line L26, normally closed contact 89—2 in line L28 and the closed contacts 83—4 in line L27; motor 85 is energized through the normally closed contacts 87—3, 74—3 and 83—6 in line L23, contacts 88—2 in line L25 and closed contacts 82—4 in line L24; and motor 84 is prevented from operation by reason of normally open contacts 81—4 in line L21 and the open contacts 82—5 in line L20 and open contacts 83—5 in line L22.

Relays 87, 88 and 89 in lines L29, L31 and L33, respectively, remain de-energized.

Motors 86 and 85 actuate their corresponding potentiometers 92 and 91 until the bucking potential applied through the potentiometers to the circuit of lamp 15 shift the phase of the latter relative to the phase resulting from the location of the unbalance mass at the time of triggering to a position where either photo-cell 64 or 65 receives light. Potentiometer 90 remains unactuated.

If photo-cell 65 receives light first, indicating that the unbalance mass is nearest to correction line E, it energizes relay 73 which in turn closes contacts 73—1 in line L27; closes contacts 73—2 in line L33 to energize relay 89; opens contacts 73—3 in line L20; and opens contacts 73—4 in line L25.

Energization of relay 89 closes the holding contacts 89—1 therefor in line L34, by-passing contacts 73—2; opens contacts 89—2 in line L28 to give control of motor 86 to relay 73 through its contacts 73—1; opens contacts 89—3 in line L20; and opens contacts 89—4 in line L25.

In the position just outlined for the relays and contacts: motor 85 is stopped by reason of the fact that contacts 83—6 in line L23 are open and contacts 89—4 and 73—4 in line L25 are opened; motor 86 continues to be energized through the normally closed contacts 88—4, 72—4 and 81—6 in line L26, closed contacts 73—1 in line L27 and closed contacts 83—4 in line L27.

When motor 86 has actuated its potentiometer 92 to buck out lamp 15 to zero, at which point photocell 65 receives no more light, relay 73 de-energizes and opens contacts 73—1 in line L27 to stop motor 86 at the position where its cam 93 is operative to set the component correction to be made at correction line E. Motor 85 was previously stopped at the position where its cam 93 is operative to set the component correction to be made at correction line D.

If the photocell 64 receives light first, indicating that the unbalance mass is nearest to correction line D, it energizes relay 72 to close contacts 72—1 in line L24 close contacts 72—2 in line L31 and energize relay 88; opens contacts 72—3 in line L22; and opens contacts 72—4 in line L26.

Energization of relay 88 closes holding contacts 88—1 therefor in line L32, opens contacts 88—2 in line L25, opens contacts 88—3 in line L22, and opens contacts 88—4 in line L26.

In the position just outlined for the relays and contacts: motor 85 continues to be energized through normally closed contacts 89—4, 73—4, and 81—5 in line L25, and closed contacts 72—1 and 82—4 in line L24; motor 86 is stopped by reason of the fact that contacts 82—6 in line L28 are open, and contacts 83—4 and 72—4 in line L26 are opened. Motor 84 remains de-energized.

Motor 85 continues to actuate its potentiometer 91 to buck lamp 15 to zero, at which point photocell 64 stops receiving light and relay 72 becomes de-energized to open contacts 72—1 in line L24 and stop the motor.

Motors 85 and 86 will have actuated their corresponding cams 93 to the desired setting for indicating and controlling the component corrections at correction lines D and E, respectively.

If the unbalance mass exists between correction lines E and C with the cup positioned as illustrated, lamp 15 will flash and send light through the wide slot 61 to photocells 68 and 69 each time the unbalance mass passes the pickup arrow 27.

Energization of photocells 68 and 69 will actuate the corresponding relays 75 and 76 which in turn close the corresponding contacts 75—1 in line L14 and 76—1 in line L16 to energize the corresponding relays 83 and 81.

Energization of relay 83 closes holding contacts 83—1 in line L15, bypassing contacts 75—1; opens contacts 83—2 in line L16; opens contacts 83—3 in line L18; closes contacts 83—4 in line L27 to energize motor 86; opens contacts 83—5 in line L22; and opens contacts 83—6 in line L23.

Energization of relay 81 closes holding contacts 81—1 in line L17; opens contacts 81—2 in line L14; opens contacts 81—3 in line L19; closes contacts 81—4 in line L21 to energize motor 84; opens contacts 81—5 in line L25; and opens contacts 81—6 in line L26.

In the position for the several contacts and relays 83 and 81 just described, with the relays energized: both contacts 83—3 and 81—3 are open assuring that relay 82 is not energized; relay 83 is energized for the remainder of the cycle through its holding contacts 83—1 in line L15 and the normally closed contacts 82—2 in the same line; relay 81 is energized for the remainder of the cycle through its holding contacts 81—1 in line L17 and the normally closed contacts 82—3 in the same line; motor 86 is energized through the normally closed contacts 87—4, 74—4, 82—6 and 89—2 in line L28 and the closed contacts 83—4 in line L27; motor 84 is energized through the normally closed contacts 89—3, 73—3 and 82—5 in line L20, the normally closed contacts 87—2 in line L22 and closed contacts 81—4 in line L21; and motor 85 is prevented from operation by reason of the normally open contacts 82—4.

Motors 86 and 84 actuate their corresponding potentiometers 92 and 90 until the bucking potential applied through the potentiometers to the circuit of lamp 15 shifts the phase of the latter relative to the phase resulting from the location of the unbalance mass at the time of triggering to a position where either photocell 65 or 66 receives light. Potentiometer 91 remains unactuated.

If photocell 66 receives light first, indicating that the unbalance mass 29 is nearest to correction line E, it energizes relay 73 which in turn closes contacts 73—1 in line L27; closes contacts 73—2 in line L33 to energize relay 89; opens contacts 73—3 in line L20; and opens contacts 73—4 in line L25.

Energization of relay 89 closes the holding contacts 89—1 therefor in line L34; opens contact 89—2 in line L28 to give control of motor 86 to relay 73 through its contacts 73—1; opens contacts 89—3 in line L20; and opens contacts 89—4 in line L25.

In the position just outlined for the relays and contacts: motor 84 is stopped by reason of the fact that contacts 89—3 and 73—3 in line L20 are both open, and contacts 83—5 in line L22 are open; and motor 86 continues to be energized through the normally closed contacts 87—4, 74—4 and 82—6 in line L28, and closed contacts 73—1 and 83—4 in line L27.

When motor 86 has actuated its potentiometer 92 to buck out lamp 15 to zero, at which point photocell 65 ceases to receive light from the lamp, relay 73 de-energizes and opens contacts 73—1 in line L27 to stop motor 86 at the position where its cam 93 is operative to set the component correction to be made at correction line E. Motor 84 was previously stopped at the position where its cam 93 is operative to set the component correction to be made at correction line C.

If photocell 66 receives light first, indicating that the unbalance mass 29 is nearest to correction line C, it energizes relay 74 which in turn closes contacts 74—1 in line L21; closes contacts 74—2 in line L29 to energize relay 87; opens contacts 74—3 in line L23; and opens contacts 74—4 in line L28.

Energization of relay 87 closes the holding contacts 87—1 therefor in line L30; opens contacts 87—2 in line L22 to give control of motor 84 to relay 74; opens contacts 87—3 in line L23; and opens contacts 87—4 in line L28.

In the position just outlined for the relays and contacts: motor 86 is stopped by reason of the fact that contacts 87—4 and 74—4 in line L28 are both open, and contacts 81—6 in line L26 are open; and motor 84 continues to be energized through the normally closed contacts 89—3, 73—3 and 82—5 in line L20, and the closed contacts 74—1 and 81—4 in line L21.

When motor 84 has actuated its potentiometer 91 to buck out lamp 15 to zero, at which point photocell 66 ceases to receive light from the lamp, relay 74 de-energizes and opens contacts 74—1 in line L21 to stop motor 84 at the position where its cam 93 is operative to set the component correction to be made at correction line C. Motor 86 was previously stopped at the position where its cam 93 is operative to set the component correction to be made at correction line E.

If at the beginning of the cycle light passing through slot 61 from lamp 15 reaches only one of the photocells 68, 69 and 70, it indicates that the unbalance mass falls directly upon one of the correction lines C, D and E.

Where light reaches only photocell 69 the unbalance mass falls on correction line C. Relay 76 will close contacts 76—1 in line L16 and energize relay 81 which in turn closes holding contacts 81—1 in line L17, and closes contacts 81—4 in line L21 to start motor 84.

At the same time photocell 66 will receive light from lamp 15 through slots 23 and 67 and will energize relay 74 which will close contacts 74—1 in line L21 and close contacts 74—2 in line L29 to energize relay 87.

Energization of relay 87 closes its holding contacts 87—1 in line L30, and opens contacts 87—2 in line L22 to give control of motor 84 to relay 74 and photocell 66 through contacts 74—1.

When motor 84 has actuated its potentiometer 91 to buck lamp 15 to zero, photocell 64 ceases to receive and relay 74 is de-energized, opening contacts 74—1 and stopping the motor at a position where its cam 93 indicates and sets the correction to be made at line C for the unbalance mass.

Where light reaches only photocell 70 the unbalance mass falls on correction line D and relay 77 will be energized and will close contacts 77—1 in line L18 to energize relay 82, which in turn closes holding contacts 82—1 and closes contacts 82—4 in line L24 to start motor 85.

At the same time photocell 64 receives light from lamp 15 and will energize relay 72 which will close contacts 72—1 in line L24 and close contacts 72—2 in line L31 to energize relay 88.

Energization of relay 88 closes its holding contacts 88—1 and opens contacts 88—2 in line L25 to give control of motor 85 to relay 72 and photocell 64 through contacts 72—1.

When motor 85 has actuated its potentiometer 91 to buck lamp 15 to zero, photocell 664 ceases to receive light and relay 72 is de-energized, opening contacts 72—1 corresponds to either of said angular locations for unbalance correction in the rotating workpiece; separate means for each of said angular location for unbalance correction to supply to said output circuit and through it to said stroboscopic means a series of successive electrical pulses; separate means to vary the magnitude of the electrical pulses of each of said first named separate means from a zero value to a maximum value exceeding the magnitude of said first series of successive electrical pulses, the increase in magnitude of said electrical pulses being adapted to shift the phase of said first named series of successive electrical pulses angularly toward the angular location for correction nearest to the angular location of unbalance whereby a stroboscopic signal is produced; means responsive to the initiation of said stroboscopic signal to control said separate means to vary said electrical pulses having a phase corresponding to the angular location for correction farthest from the angular location of unbalance by stopping the increase of said electrical pulses; means coupled to said separate means to vary the magnitude of the electrical pulses and responsive to a termination of said stroboscopic signal effected when said separate means to vary said electrical pulses having a phase corresponding to the angular location for correction nearest to the angular location of unbalance has fully counteracted the corresponding component of said first series of successive electrical pulses to stop further varying of the amplitude of the electrical pulses; and means responsive to each of said separate varying means to determine the component amount of correction at the corresponding angular location for unbalance correction in the workpiece.

4. Apparatus for automatically measuring and determining components of unbalance correction to be made at preselected angular locations in a rotary workpiece, comprising means including a circuit to provide a series of successive electrical pulses of a frequency corresponding to the rotational frequency of the workpiece, of a phase dependent upon the angular location of unbalance in the workpiece, and which is proportional in magnitude to the amount of unbalance in the workpiece; means including another circuit to provide a second series of successive electrical pulses of a frequency corresponding to said first series of successive electrical pulses and in opposite phase relation thereto, said second series comprising two component pulses corresponding in phase opposition to the unbalance correction components to be measured; magnitude varying means in the circuit of said second means to selectively vary the magnitude of each component of said second series of successive electrical pulses from a zero value to a maximum value exceeding the magnitude of said first series of successive electrical pulses; stroboscopic means connected to said first and second named means to produce a signal responsive to the resultant of the first and second series of electrical pulses, said stroboscopic means being connected to means which automatically control said magnitude varying means to stop the increase in magnitude of each component of said second series of successive electrical pulses when each component of said second series effectively corresponds to the corresponding component in the first series and said modified signal is thereby reduced to zero; and unbalance correction determining means proportionally responsive to said last-named means.

References Cited in the file of this patent

UNITED STATES PATENTS

| | | |
|---|---|---|
| 2,108,624 | Thearle | Feb. 15, 1938 |
| 2,165,024 | Baker | July 4, 1939 |
| 2,243,379 | Johnson | May 27, 1941 |
| 2,315,578 | Baker | Apr. 6, 1943 |
| 2,331,733 | Senger | Oct. 12, 1943 |
| 2,363,373 | Werner | Nov. 21, 1944 |
| 2,451,863 | Oakley | Oct. 19, 1948 |
| 2,720,781 | Federn | Oct. 18, 1955 |
| 2,783,649 | Hope | Mar. 5, 1957 |
| 2,787,907 | King | Apr. 9, 1957 |
| 2,805,576 | Rambo | Sept. 10, 1957 |
| 2,816,463 | Budington et al. | Dec. 17, 1957 |
| 2,851,885 | Federn et al. | Sept. 16, 1958 |
| 2,919,581 | Lash | Jan. 5, 1960 |

FOREIGN PATENTS

| | | |
|---|---|---|
| 642,916 | Great Britain | Sept. 13, 1950 |
| 715,627 | Great Britain | Sept. 15, 1954 | and stopping motor 85 at a position where its cam 93 indicates and sets the correction to be made at line D for the unbalance mass.

Where light reaches only photocell 68 the unbalance mass falls on correction line E and relay 75 is energized to close contacts 75—1 in line L14 and energize relay 83 which in turn closes holding contacts 83—1 and closes contacts 83—4 in line L27 to start motor 86.

At the same time photocell 65 receives light from lamp 15 and will energize relay 73 and thereby close contacts 73—1 in line L27 and contacts 73—2 in line L33 to energize relay 89.

Energization of relay 89 closes its holding contacts 89—1 and opens contacts 89—2 in line L28 to give control of motor 86 to relay 73 and photocell 65 through contacts 73—1.

When motor 86 has actuated its potentiometer 91 to buck lamp 15 to zero, photocell 65 ceases to receive light and relay 73 is de-energized, opening contacts 73—1 and stopping motor 86 at a position where its cam 93 indicates and sets the correction to be made at line E for the unbalance mass.

Each cycle of operation of the device terminates when the motors 84, 85 and 86 are all stopped, and they remain so until contacts 80 open and reset the several relays and contacts for the next cycle. Thereafter, closing of contacts 80 starts the next cycle.

Motors 84, 85 and 86 are reversible and when contact switch 80 disconnects lead 78 from the source of power it closes a lead line 94 going to the motors for reversing them and returning the potentiometers 90, 91 and 92 to zero before starting of the next cycle. A limit switch 95 for each motor 84, 85 and 86 stops its reversal when the corresponding potentiometer reaches zero.

Similarly in FIGS. 1 and 6 the contact switch 42 connects the power source to a lead 96 going to motors 43 and 45 to reverse the same and return their potentiometers 34 and 36 to zero, ready for the next cycle. A limit switch 97 for each motor 43 and 45 stops its reversal when the corresponding potentiometer reaches zero.

In the embodiment of FIGS. 10–14 the generators 98 driven by motor 17 supply the necessary bucking voltages through the potentiometers and control circuits for their corresponding correction planes. Each generator supplies a different phase to each of its corresponding potentiometers 90, 91 and 92 as indicated by the pairs of lead lines 99, 100 and 101 for the control circuit shown for plane 12. Similar lead lines are labeled 11 for plane 13. A suitable calibrating potentiometer 102 may be provided for each of the bucking voltages.

In the circuit illustrated the bucking voltage of lines 99 passing through potentiometer 90 are opposite in phase to the voltage produced by an unbalance at correction line C; the bucking voltage of lines 100 passing through potentiometer 91 are opposite in phase to the voltage produced by an unbalance at correction line D; and the bucking voltage of lines 101 passing through potentiometer 92 are opposite in phase to the voltage produced by an unbalance at correction line E.

The invention provides an automatic determination of the correction to be made at one or more selected correction locations for a given workpiece, and where the correction must be made at more than one location, the invention provides an automatic determination of the component corrections to be made at each location.

The setting of the corresponding cams 93 provides a record of the amount of correction to be made, and serves to indicate the same and to control correction apparatus, not shown.

Various modes of carrying out the invention are contemplated as within the scope of the following claims particularly pointing out and distinctly claiming the subject matter which is regarded as the invention.

I claim:

1. Apparatus for automatically measuring and determining the components of unbalance correction to be made at preselected angular locations in a rotary workpiece, comprising means including a circuit to provide a series of successive electrical pulses of a frequency corresponding to the rotational frequency of the workpiece, of a phase dependent upon the angular location of unbalance in the workpiece, and which is proportional in magnitude to the amount of unbalance in the workpiece; means including another circuit to provide a second series of successive electrical pulses of a frequency corresponding to said first series of successive electrical pulses and in opposite phase relation thereto, said second series comprising two component pulses corresponding in phase opposition to the unbalance correction components to be measured; means in the circuit of said second means to selectively vary the magnitude of each component of said second series of successive electrical pulses from a zero value to a maximum value exceeding the magnitude of said first series of successive electrical pulses; a stroboscopic lamp; means connecting the circuits of both said series of successive electrical pulses simultaneously to said stroboscope lamp; light pick-up means disposed to receive light pulses from said lamp; means responsive to said light pick-up means to automatically and selectively control each of said magnitude varying means to stop the increase in magnitude of said second series of successive electrical pulses when said series fully counteracts said first series of successive electrical pulses and extinguishes said lamp; and unbalance correction determining means proportionally responsive to said last named means.

2. Apparatus for automatically measuring and determining the components of unbalance correction to be made at preselected angular locations in a rotary workpiece, comprising means including a circuit to provide a series of successive electrical pulses of a frequency corresponding to the rotational frequency of the workpiece, of a phase dependent upon the angular location of unbalance in the workpiece, and which is proportional in magnitude to the amount of unbalance in the workpiece; means including another circuit to provide a second series of successive electrical pulses of a frequency corresponding to said first series of successive electrical pulses and in opposite phase relation thereto, said second series comprising two component pulses corresponding in phase opposition to the unbalance correction components to be measured; means in the circuit of said second means to selectively vary the magnitude of each component of said said second series of successive electrical pulses from a zero value to a maximum value exceeding the magnitude of said first series of successive electrical pulses; stroboscopic means connected to both said circuits to be energized by the resultant of both series of successive electrical pulses; means responsive to said stroboscopic means to automatically and selectively control each of said magnitude varying means to stop the increase in magnitude of said second series of successive electrical pulses when said series fully counteracts said first series of successive electrical pulses and de-energizes said stroboscopic means; and unbalance correction determining means proportionally responsive to said last named means.

3. Apparatus for measuring the component amounts of unbalance in a rotating workpiece as related to two separate angular locations for correction of unbalance in the workpiece, comprising means including an output circuit to provide a series of successive electrical pulses of a frequency corresponding to the rotational frequency of the workpiece, of a phase dependent upon the angular location of unbalance in the workpiece, and which is proportional in magnitude to the amount of unbalance in the workpiece; stroboscopic means connected to said output circuit to be energized thereby; said stroboscopic means being adapted to produce a signal when the phase relationship of the electrical pulses energizing the same

UNITED STATES PATENT OFFICE
CERTIFICATE OF CORRECTION

Patent No. 3,033,041

May 8, 1962

Robert J. Fibikar

It is hereby certified that error appears in the above numbered patent requiring correction and that the said Letters Patent should read as corrected below.

Column 8, line 58, for "26" read -- L26 --; column 12, line 54, for "64 ceases to receive" read -- 66 ceases to receive light --; line 74, for "664" read -- 64 --.

Signed and sealed this 4th day of September 1962.

(SEAL)
Attest:

ERNEST W. SWIDER
Attesting Officer

DAVID L. LADD
Commissioner of Patents